United States Patent
Abdulrahiman et al.

(10) Patent No.: US 8,555,062 B1
(45) Date of Patent: Oct. 8, 2013

(54) PROTOCOL TO PREVENT REPLAY ATTACKS ON SECURED WIRELESS TRANSACTIONS

(75) Inventors: Najeeb Abdulrahiman, Fremont, CA (US); Lisa Guo, Saratoga, CA (US)

(73) Assignee: ACCESS Co., Ltd., Tokyo (JP)

( * ) Notice: Subject to any disclaimer, the term of this patent is extended or adjusted under 35 U.S.C. 154(b) by 1723 days.

(21) Appl. No.: 09/818,082

(22) Filed: Mar. 26, 2001

(51) Int. Cl.
*H04L 9/32* (2006.01)

(52) U.S. Cl.
USPC .......................................... 713/168

(58) Field of Classification Search
USPC ......... 713/151, 152, 153, 168, 171; 709/182, 709/225, 227, 228, 232, 237; 705/64, 75
See application file for complete search history.

(56) References Cited

U.S. PATENT DOCUMENTS

| | | | | |
|---|---|---|---|---|
| 5,923,756 | A * | 7/1999 | Shambroom | 713/156 |
| 6,081,900 | A * | 6/2000 | Subramaniam et al. | 713/201 |
| 6,148,405 | A * | 11/2000 | Liao et al. | 726/2 |
| 6,199,113 | B1 * | 3/2001 | Alegre et al. | 709/229 |
| 6,233,608 | B1 * | 5/2001 | Laursen et al. | 709/217 |
| 6,742,126 | B1 * | 5/2004 | Mann et al. | 713/201 |
| 6,779,033 | B1 * | 8/2004 | Watson et al. | 709/227 |
| 7,366,900 | B2 * | 4/2008 | Shambroom | 713/168 |
| 7,451,312 | B2 * | 11/2008 | Medvinsky et al. | 713/168 |
| 2002/0023213 | A1 * | 2/2002 | Walker et al. | 713/168 |
| 2005/0027985 | A1 * | 2/2005 | Sprunk et al. | 713/171 |
| 2007/0143604 | A1 * | 6/2007 | Arroyo et al. | 713/167 |

OTHER PUBLICATIONS

Mik Lamming, Marge Eldridge, Mike Flynn, Chris Jones, and David Pendlebury, Satchel: Providing Access to Any Document, Any Time, Anywhere, Sep. 2000, ACM Transactions on Computer-Human Interaction, vol. 7, No. 3.*
A. Freier, P. Karlton, and P. Kocher. The SSL protocol version 3.0. draft-ietf-tls-ssl-version3-00.txt, Nov. 18, 1996.*
SSL & TLS Specifications. <http://www21.ocn.ne.jp/~k-west/SSLandTLS/index-e.html>.*

* cited by examiner

*Primary Examiner* — Tamara T Kyle
(74) *Attorney, Agent, or Firm* — Baker Hostetler LLP

(57) ABSTRACT

A system and method for preventing replay attacks on secure data transactions are provided. The method aspect of the invention comprises establishing a communicating coupling with an authorized device, receiving a signal from the device requesting a session identification number, generating the session identification number and communicating the session identification number to the device, receiving a signal from the device that comprises a request for secure data transmission and includes the session identification number and coupling the device communicatively to implement the secure data transaction provided the request is authorized based on the session identification number.

16 Claims, 10 Drawing Sheets

100a

100b

PROTOCOL TO PREVENT REPLAY ATTACKS ON SECURED WIRELESS TRANSACTIONS

BACKGROUND OF THE INVENTION

1. Field of the Invention

The present invention relates to the field of portable devices such as personal digital assistants or palmtop computer systems. More specifically, embodiments of the present invention relate to wireless communication using a portable computer system and a second ("host") computer system.

2. Related Art

As the components required to build a computer system have reduced in size, new categories of electronic devices and computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been known as Personal Digital Assistants (PDAs). Many PDAs have a small and flat display screen associated therewith.

User convenience and device value are very important factors for portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required in order to access information from an electronic device (or to store information into the electronic device) is crucial for producing a commercially successful and useful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities.

Similarly, the more useful the device, the more the device will be used and acquired. The functionality of mobile wireless devices is undergoing a transition. Mobile devices are evolving from a single application device with dedicated specific purpose communication channel (for example, a cell phone or pager), to more general-purpose devices with more flexible data communication capabilities.

More specifically, wireless technology is advancing, both in the number of options that are available for providing connectivity, and in the flexibility to provide general purpose data communication. Different technologies such as cellular technologies (e.g., CDMA, TDMA), LAN access technologies (e.g., IEEE 802.11, HomeRF) and PAN technologies (e.g., Bluetooth, IR) each address a different set of needs, and provide a different set of potential services. Mobile devices are no longer restricted to a single communication channel. Modular mobile devices allow network interfaces to be attached, allowing for unlimited communications configurations. In addition, Bluetooth technology allows a single mobile device to simultaneously access multiple piconets through a single interface.

To facilitate mobile wireless communication, several wireless modem peripheral devices are available that can be directly connected to the serial interface port of a host computer system thereby providing wireless communication to the internet. Wireless communication between two stations via the Internet requires security for the users as well as protection of any data being exchanged. More specifically, user identification and verification of authorization to access given data are both important considerations. Equally important is user protection from a replay attack whereby intercepted identification/access data is used by an attacker to gain unauthorized access to an account.

In the prior art, one method for protecting against unauthorized use of a computer system or against unauthorized access to information stored in a computer system is to use a password. However, passwords are considered by many users to be vexing and inconvenient. Passwords can lock out even an authorized user, and experience shows that passwords can be defeated by unauthorized users. In addition, while a password may prevent access to applications and information already existing on the palmtop, it will generally not prevent an unauthorized user from adding new applications and information. Thus, an unauthorized user can simply assume ownership of the palmtop and ignore the password-protected information.

In the prior art, user security is often provided by the assignment of a unique user identification number (ID) such as the manufacturers serial number (MAN) of the PDA being used. Such is the case with the Mobitex Network utilized with Palm PDAs. However, an attacker could intercept such a transaction, modify the MAN number and access a different web clipping proxy server (WCP) in order to replay the intercepted message, thereby defeating the intended user security. For other TCP/IP based wireless networks (GSM, CDPD, etc.), or wire-line networks, a MAN number may not exist and the request from a single PDA source may even be directed to other WCP servers.

A sequence number is used to thwart replay attacks for secure transactions in the prior art. Sequence numbers are stored in a given WCP server for each secure transaction. This implementation assumes that the request from one PDA will always go to the same WCP server. However, this assumption may not be valid for TCP/IP based wireless or wire-line networks because the dispatcher will not be load balanced. In such cases, the load balance could be a round robin among available servers and the storage of a sequence number in a particular server for security purposes will then result in communication failure. Actually, the assumption may be broken even in the case of multiple meta-cluster Mobitex servers, which would likewise result in failure to communicate.

SUMMARY OF THE INVENTION

Accordingly, what is needed is a more generally applicable method or system that offers increased security during secure data transactions. What is also needed is a method or system that will not only increase security but will also prevent unauthorized access to a data transaction by means of intercepted data. In addition, what is needed is a method or system that will function properly without requiring a device to communicate exclusively with a given server or central system.

A method and system for preventing replay attacks on secure data transactions is described. A replay attack occurs when an unauthorized user intercepts a secure data transaction between a device and a central system and uses the intercepted data to gain access to the central system. One method for preventing such replay attacks is the use of a unique session identification number that is generated for each secure data transaction request. A replay attack is defeated using intercepted data since the unique session identification number is valid only for a completed session and may not be reused. When a device is connected to a server using either wireless or land-line connection, the device requests a session identification number from the server. The server generates and signals to the device a unique session identification number which the device then transmits back to the server along with a request for a secure data transaction. Upon verification of the correct unique session identification number, the server implements the requested data transaction. Termination of the requested transaction by the device signals the termination of the current secure data transaction. A new unique session identification number must be requested and issued in like fashion for any additional secure data transactions. The method and system offer the advantage of use with multiple available servers, in contrast to present methods which require that a device to communicate with a given server. Further, the present method offers reduced operation time since there is a single coupling/uncoupling for each data transaction.

In one embodiment, a device communicates with a server or system which is the World Wide Web site residing on a server computer system in a computer system network (e.g. the internet). The proxy server receives a signal from the device requesting a unique session identification number in preparation for a secure data transaction. The server generates and communicates a unique session identification number to the device. The device then returns a signal to the server which includes the unique identification number along with the request for a secure data transaction. The server compares the returned unique session identification number with the original and provided the comparison is satisfactory the requested secure data transaction is implemented. Upon completion of the requested secure data transaction, the session is terminated by the device.

In one embodiment, the device communicating with a server or system is a portable device such as a palmtop computer system or PDA. The portable device transmits a signal to a server or system requesting a session identification number in preparation for a secure data transaction. In response to this request, the portable device receives a unique session identification number generated by the server or system. The portable device then transmits a signal to the server or system requesting a secure data transaction and which signal includes the unique session identification number. Provided the returned unique session identification number matches the original generated by the server, the portable device is permitted to complete the requested secure data transaction. Upon completion of the secure data transaction, the portable device decouples communicatively from the server or system which signals termination of the current secure data transaction.

DETAILED DESCRIPTION OF THE INVENTION

Figure 1A:
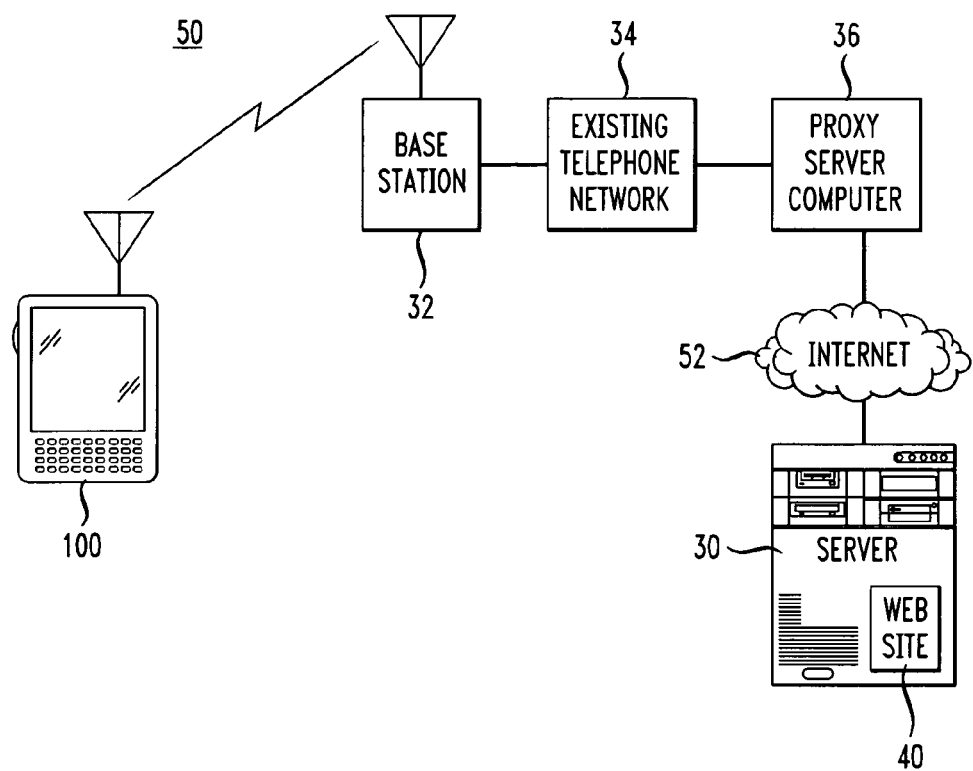
FIG. 1A is a block diagram of an exemplary network environment including a portable computer system in accordance with one embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "indexing" or "receiving" or "performing" or "initiating" or "sending" or "implementing" or "disabling" or "enabling" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a portable computer system, such as a palmtop or personal digital assistant, with the capability to access via the Internet a World Wide Web ("Web") site residing on a server computer system. However, it is appreciated that the present invention can be used with other types of devices that have the capability to access some type of central device or central site, including but not limited to laptop computer systems.

Exemplary Palmtop Platform

FIG. 1A is a block diagram of an exemplary network environment 50 including a portable computer system 100 in accordance with one embodiment of the present invention. Portable computer system 100 is also known as a palmtop or palm-sized computer system or as a personal digital assistant (PDA). In one embodiment, portable computer system 100 has the ability to transmit and receive data and information over a wireless communication interface (e.g., a radio interface). In one embodiment, the wireless communication interface is integrated into portable computer system 100; in another embodiment, the wireless communication interface is accomplished with a wireless modem attachment (not shown).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. Coupled with Internet 52 are multiple servers exemplified by server 30. Residing on server 30 is a Web site 40. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

FIGS. 1B, 1C, 1D, 1E and 1F are block diagrams showing various embodiments of a system 51 for coupling a portable computer system 100 to other computer systems and to the Internet 52 in accordance with the present invention. System 51 is described in the context of wired connections between its various devices and components; however, it is appreciated that wireless connections (such as but not limited to Bluetooth wireless connections) can also be used.

Figure 1B:
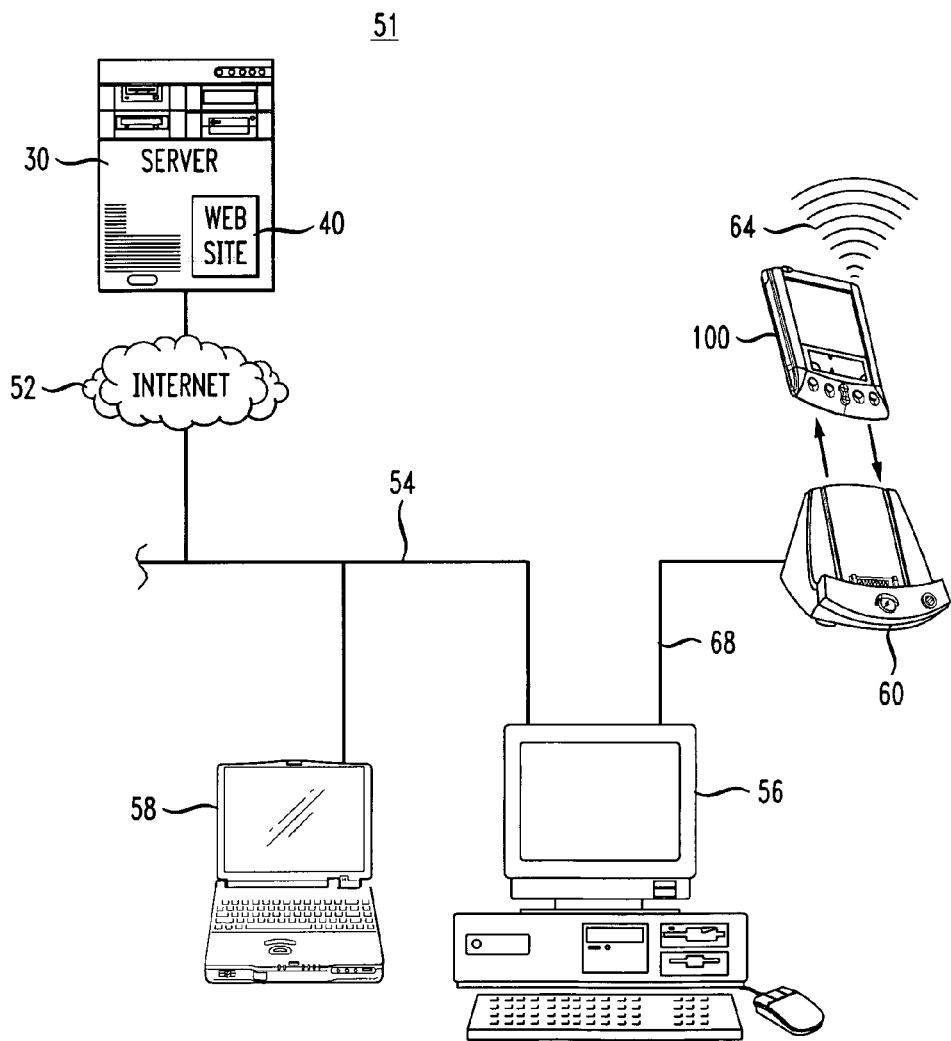
FIGS. 1B, 1C, 1D, 1E and 1F are block diagrams showing various embodiments for coupling a portable computer system to other computer systems and to the Internet in accordance with the present invention.

With reference first to FIG. 1B, system 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54 such as an Ethernet Local Area Network (LAN), but which can instead be any of a number of other types. Bus 54 can provide communication with the Internet 52 using a number of well-known protocols.

Coupled with Internet 52 are multiple servers exemplified by server 30. Residing on server 30 is a Web site 40.

Importantly, in the present embodiment, host computer system 56 is also coupled via connector cable 68 to a cradle 60 for receiving and initiating communication with portable computer system 100 ("handheld computer") of the present invention. Connector cable 68 can be a serial bus (e.g., RS232), a parallel bus, a Universal Serial Bus (USB), or any other type of workable connection. Cradle 60 provides an electrical and mechanical communication interface between connector cable 68 and portable computer system 100 for two-way communications with host computer system 56. Portable computer system 100 also contains a wireless infrared communication mechanism 64 for sending and receiving information from other devices.

Figure 1C:
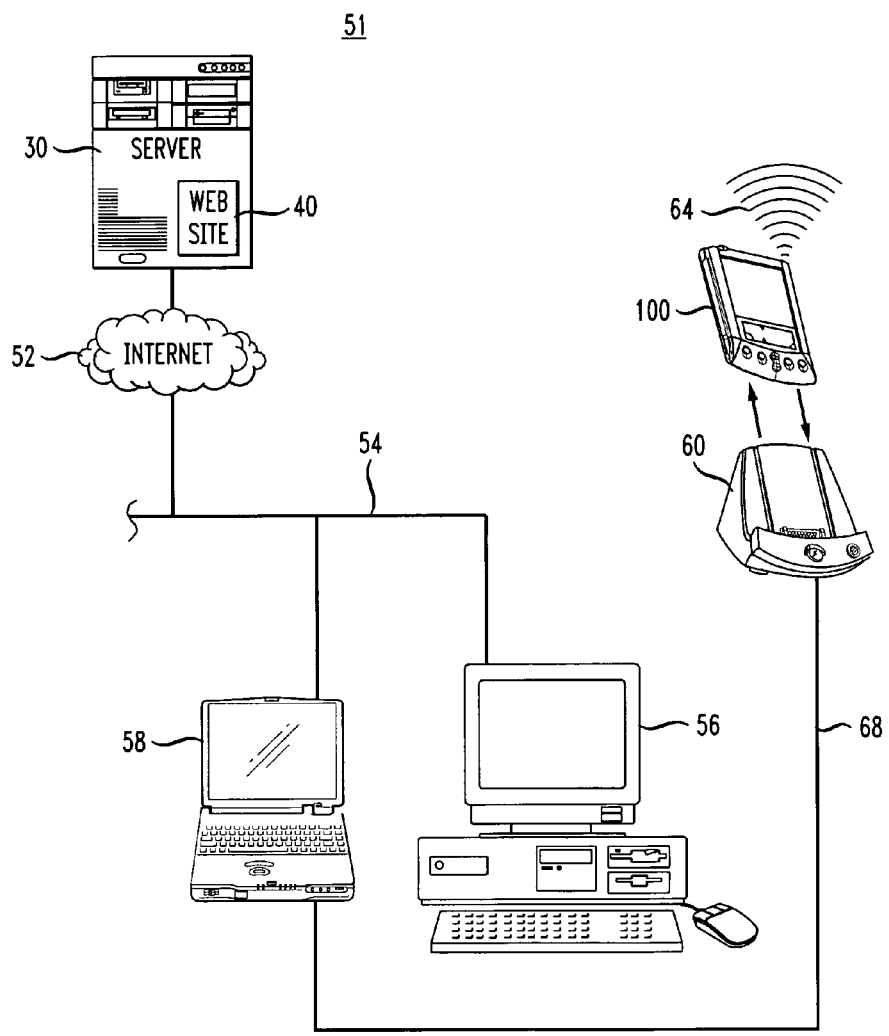

With reference next to FIG. 1C, in this embodiment, laptop system 58 is coupled via connector cable 68 to cradle 60. As described above, connector cable 68 can be a serial bus (e.g., RS232), a parallel bus, a USB, or any other type of workable connection for enabling two-way communication between portable computer system 100 and laptop system 58.

Figure 1D:
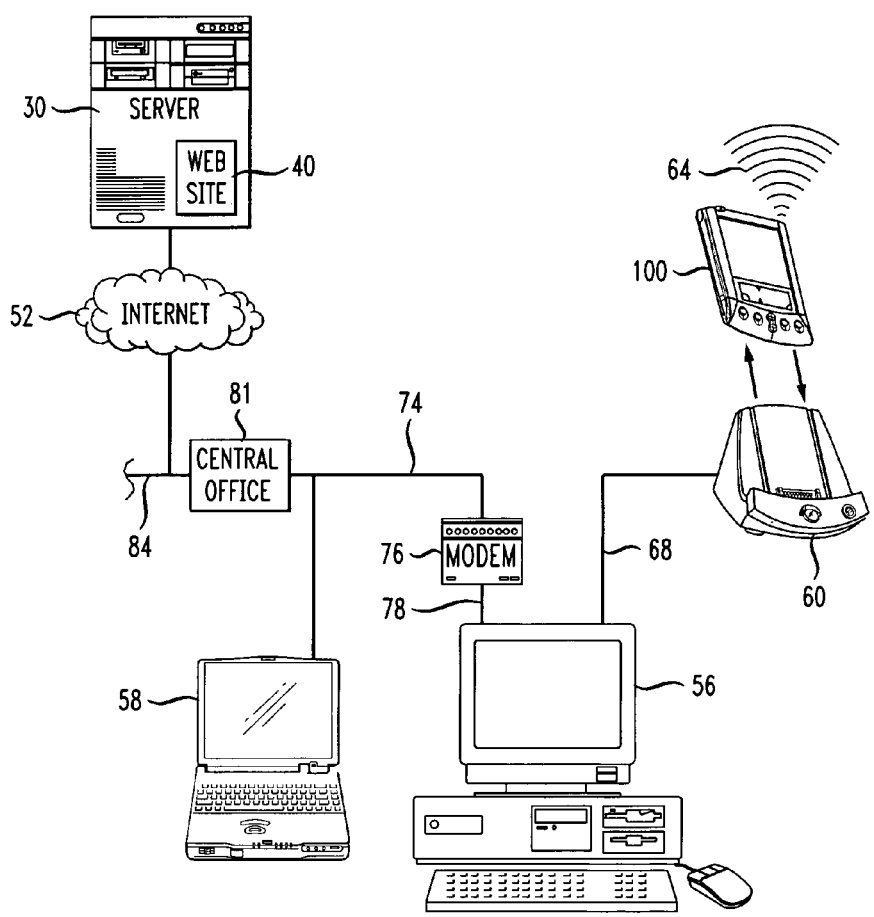

FIG. 1D shows another embodiment of system 51 in accordance with the present invention. In this embodiment, host computer system 56 is coupled via connector cable 68 to cradle 60. Host computer system 56 is also coupled to a modem 76 via another connector cable 78. Connector cable 78 can be a serial bus, a parallel bus, a USB, or any other type of workable connection that can be used for allowing two-way communication between host computer system 56 and the Internet 52. In this embodiment, connector cable 78 is coupled with a wire line 74 to a central office (or cable office, etc.) 81 via modem 76. Modem 76 can be internal to or external to host computer system 56. Modem 76 can be an analog modem, a cable modem, an ADSL (Asymmetric Digital Subscriber Line) modem, or any other such device. Central office 81 in turn is communicatively coupled to the Internet 52 via some type of well-known communication line 84.

Figure 1E:
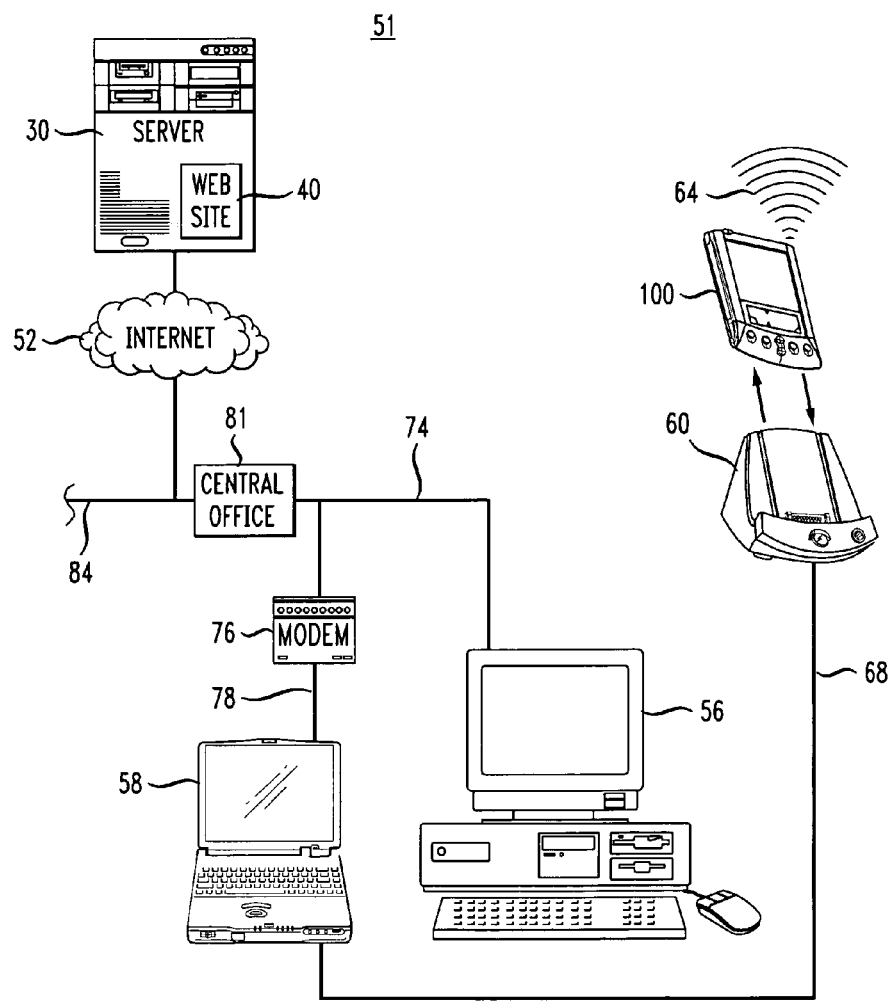

FIG. 1E shows another embodiment of system 51 in accordance with the present invention. In this embodiment, laptop system 58 is coupled via connector cable 68 to cradle 60. Laptop system 58 is also coupled to modem 76 via connector cable 78. In this embodiment, connector cable 78 is coupled with wire line 74 to central office 81 via modem 76. Central office 81 in turn is communicatively coupled to the Internet 52 via communication line 84.

Figure 1F:
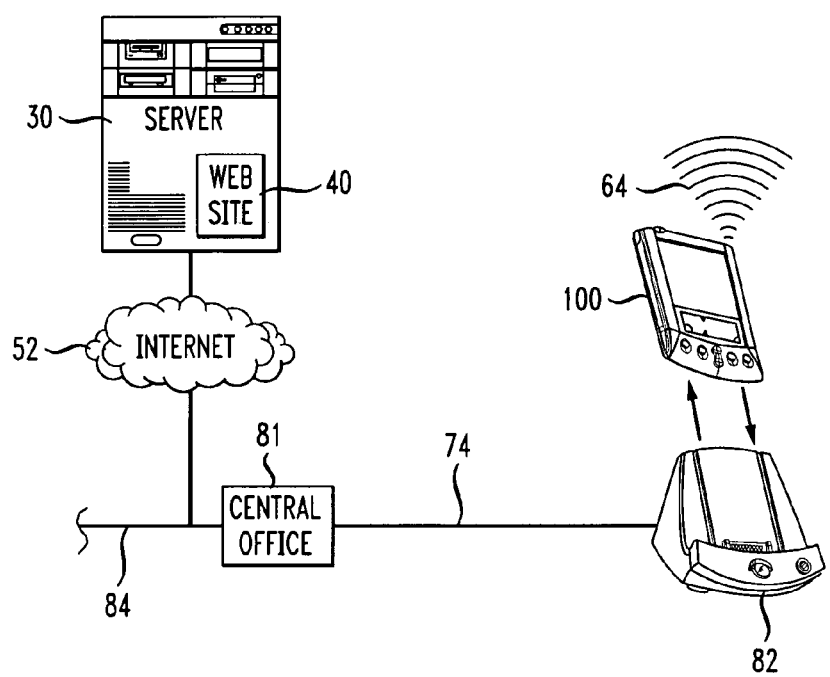

FIG. 1F shows another embodiment of system 51 in accordance with the present invention. In this embodiment, portable computer system 100 is coupled with wire line 74 via a modem 82. In one embodiment, portable computer system 100 is a Palm V or other such PDA, and modem 82 is a Palm V modem or PDA modem. Wire line 74 is communicatively coupled to central office 81 which in turn is communicatively coupled to the Internet 52 via communication line 84.

With reference to FIGS. 1A through 1F, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
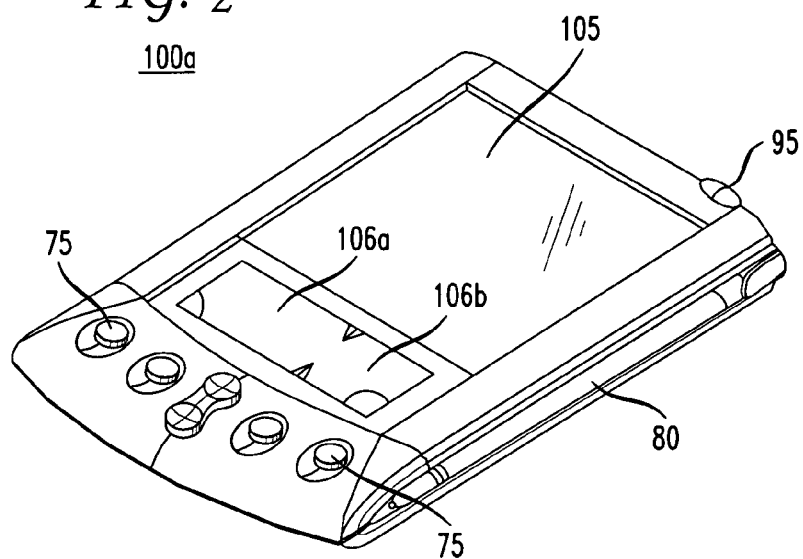
FIG. 2 is a top side perspective view of a portable computer system in accordance with one embodiment of the present invention.

FIG. 2 is a perspective illustration of the top face 100a of one embodiment of the palmtop computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
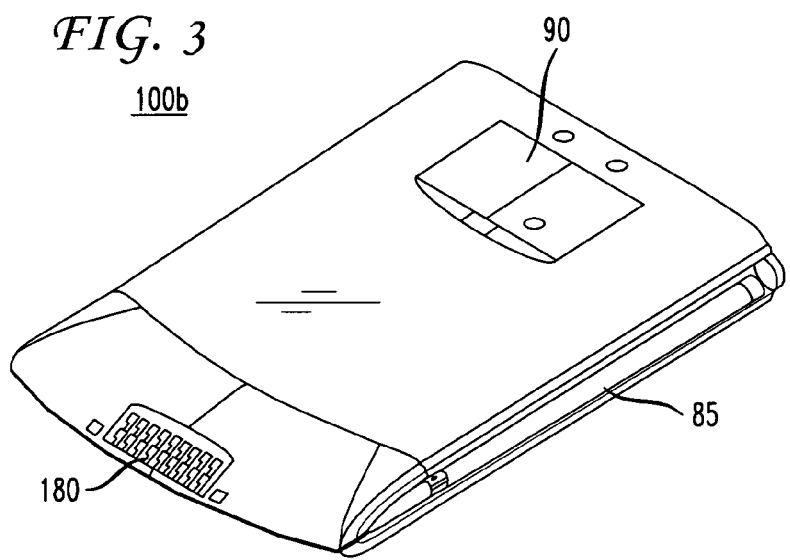
FIG. 3 is a bottom side perspective view of the portable computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
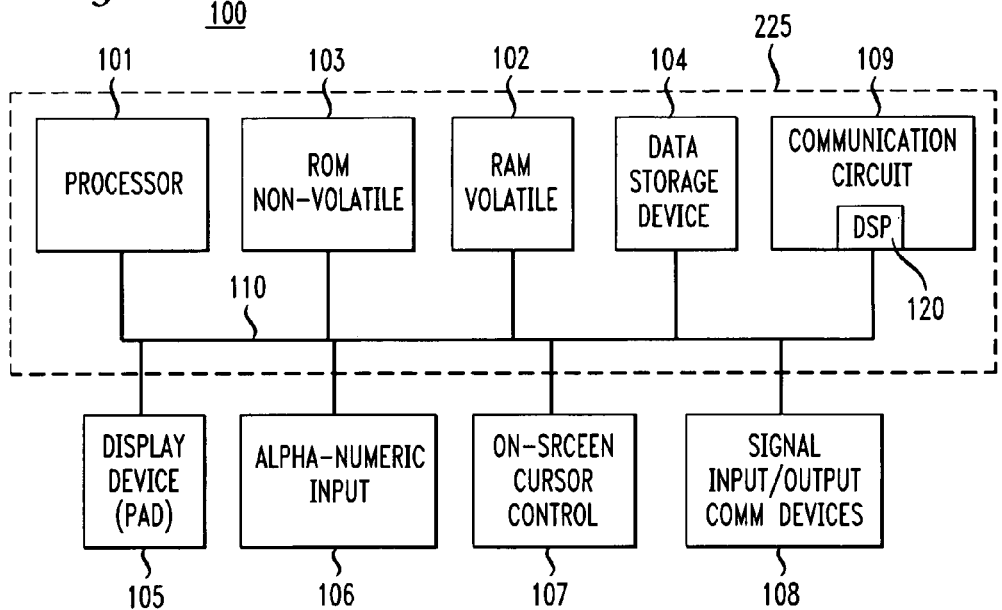
FIG. 4 is a block diagram of one embodiment of a portable computer system in accordance with the present invention.

FIG. 4 illustrates circuitry of computer system 100. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 4, computer system 100 also includes a signal transmitter/receiver device 108, which is coupled to bus 110 for providing a physical communication link between computer system 100, and a network environment (e.g., network environments 50 and 51 of FIGS. 1A through 1F). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 4 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 5:
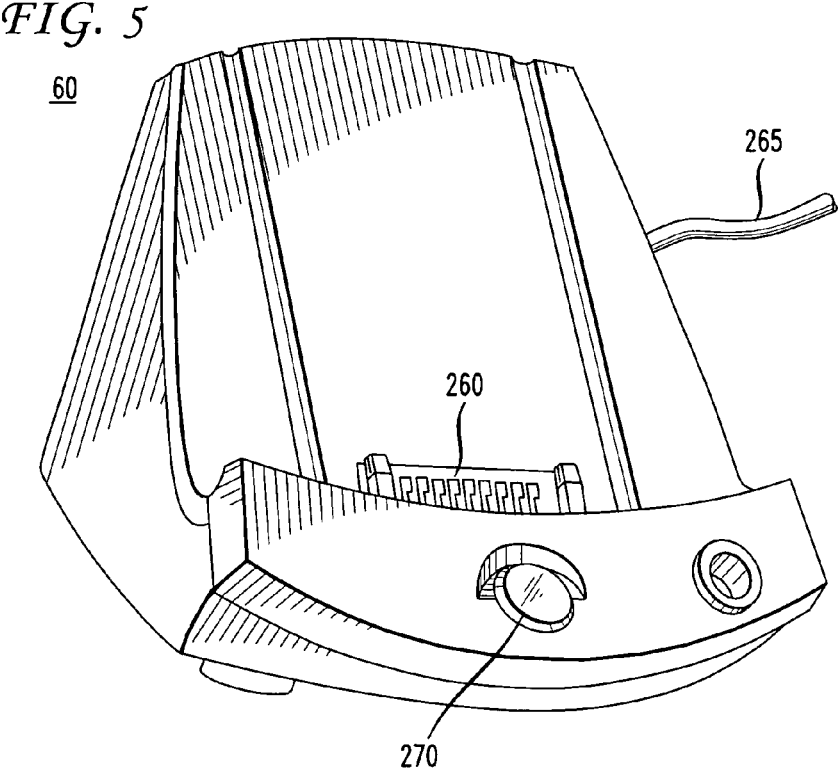
FIG. 5 is a perspective view of the cradle device for connecting the portable computer system to other systems via a communication interface in accordance with one embodiment of the present invention.

FIG. 5 is a perspective illustration of one embodiment of the cradle 60 for receiving the palmtop computer system 100. Cradle 60 contains a mechanical and electrical interface 260 for interfacing with communication interface 108 (FIG. 3) of computer system 100 when system 100 is slid into the cradle 60 in an upright position. Once inserted, button 270 can be pressed to initiate two-way communication (e.g., a communication session) between computer system 100 and other computer systems coupled to serial communication 265.

Exemplary Desktop/Laptop/Server Platform

Figure 6:
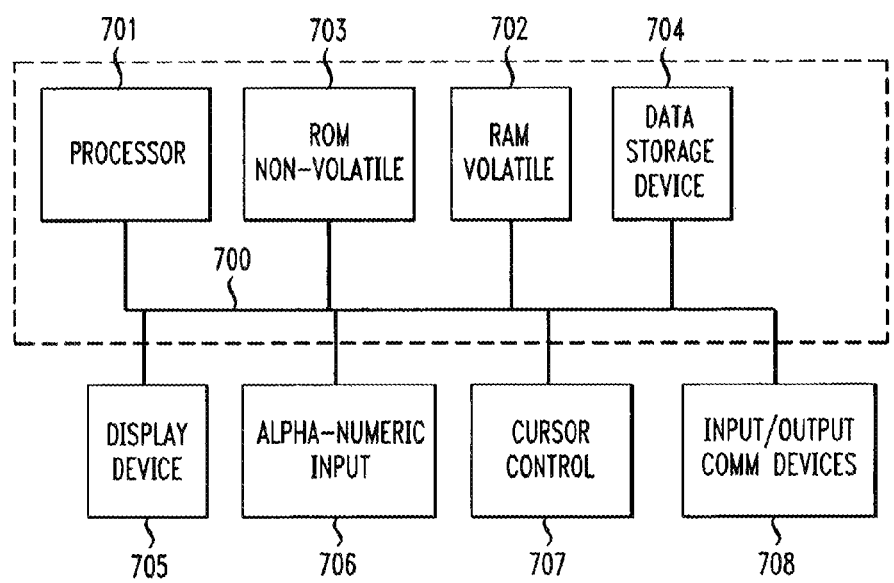
FIG. 6 is a block diagram of one embodiment of a server, desktop or laptop computer system in accordance with the present invention.

Refer now to FIG. 6 which illustrates an exemplary computer system 342 with which embodiments of the present invention may be practiced. Computer system 342 exemplifies desktop computer system 56 or laptop computer system 58 of FIG. 1B. Computer system 342 also exemplifies a server computer system in a computer system network (such as server 30 in FIGS. 1A through 1F) or a proxy server computer (e.g., proxy server 36 of FIG. 1A).

Continuing with reference to FIG. 6, in general, computer system 342 comprises bus 700 for communicating information, processor 701 coupled with bus 700 for processing information and instructions, random access (volatile) memory (RAM) 702 coupled with bus 700 for storing information and instructions for processor 701, read-only (non-volatile) memory (ROM) 703 coupled with bus 700 for storing static information and instructions for processor 701, data storage device 704 such as a magnetic or optical disk and disk drive coupled with bus 700 for storing information and instructions, an optional user output device such as display device 705 coupled to bus 700 for displaying information to the computer user, an optional user input device such as alphanumeric input device 706 including alphanumeric and function keys coupled to bus 700 for communicating information and command selections to processor 701, and an optional user input device such as cursor control device 707 coupled to bus 700 for communicating user input information and command selections to processor 701. Furthermore, an optional input/output (I/O) device 708 is used to couple computer system 342 to, for example, a communication bus (e.g., communication bus 54 of FIG. 1B).

Continuing with reference to FIG. 6, display device 705 utilized with computer system 342 may be a liquid crystal device, cathode ray tube, or other display device suitable for creating graphic images and alphanumeric characters recognizable to the user. Cursor control device 707 allows the computer user to dynamically signal the two-dimensional movement of a visible symbol (pointer) on a display screen of display device 705. Many implementations of the cursor control device are known in the art including a trackball, mouse, joystick or special keys on alphanumeric input device 706 capable of signaling movement of a given direction or manner of displacement. It is to be appreciated that the cursor control 707 also may be directed and/or activated via input from the keyboard using special keys and key sequence commands. Alternatively, the cursor may be directed and/or activated via input from a number of specially adapted cursor directing devices.

Figure 7:
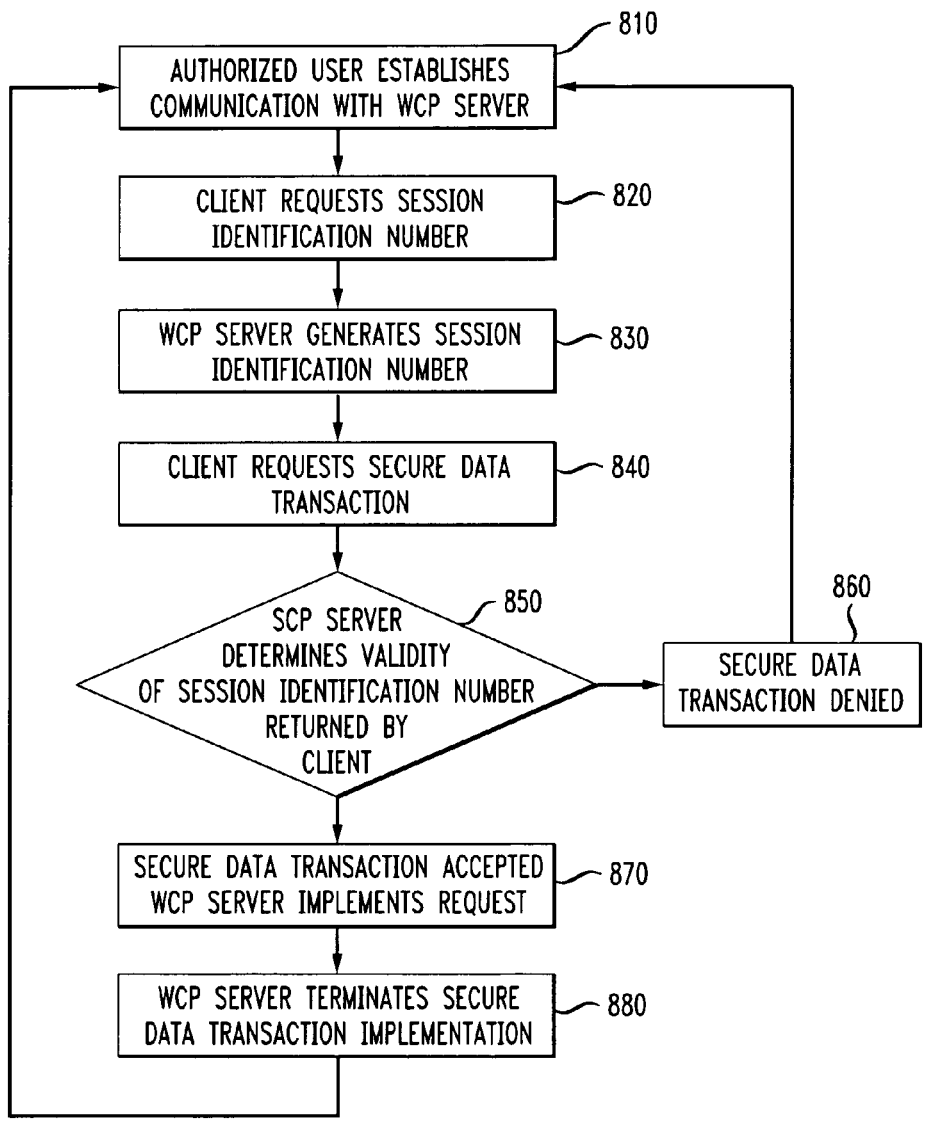
FIG. 7 is a flowchart showing the steps in a process for preventing replay attacks on secure data transactions in accordance with one embodiment of the present invention.

FIG. 7 is a flowchart showing the steps in a protocol 800 for preventing unauthorized access to a secure data transaction between a device (e.g. portable computer system 100 of FIGS. 1A through 1F) and a system or server (e.g. 36 of FIG. 1A) by utilizing a unique session identification number for each data transaction in one embodiment of the present invention.

In step 810 of FIG. 7, in the present embodiment, the owner or an authorized user of portable computer system 100 (the client) establishes communication with a web clipping proxy (WCP) server, 36 of FIG. 1A. The WCP server communicates via the internet, 52 of FIG. 1A, with a web site, 40 of FIG. 1A, on the World Wide Web network. Web site 40 typically resides on a server computer system (e.g. a "central device") as exemplified by server 30 of FIGS. 1A through 1F. In one embodiment, the portable computer system 100 communicating with the WCP server 36 is a portable device such as a palmtop computer system or PDA.

With reference still to FIG. 7, the client 100 desires an exchange of information with web site 40, and in step 820 transmits a signal to the WCP server 36 requesting a session identification number in preparation for a secure data transaction.

In step 830, the WCP server 36 generates a session identification number in response to the client request made in step 820. The generated session identification number is singular in form and will only be generated one time for the requesting client. It is to be appreciated that the WCP server 36 has the capacity to recognize the requesting client 100, correlate the generated session identification number with the requesting client 100, and prevent any future generation of the same session identification number for the same client 100. The generated session identification number is then communicated by the WCP server 36 to the client 100 where it is stored in preparation for a secure data transaction request.

Continuing with step 840 of FIG. 7, the client 100 formulates a request for a secure data transaction which includes the session identification number, and transmits the formulated request to the WCP server 36.

In step 850, the WCP server 36 receives the formulated secure data transaction request from the client 100. The session identification number included with the request is compared by the WCP server 36 with the original session identification number generated by the WCP server 36.

If the comparison does not result in an exact match, the current request for a secure data transaction is denied in step 860. It is understood that if no response is received by the client 100 from the WCP server 36, the current request for a secure data transaction is denied Alternatively, the WCP server 36 could be configured to transmit a signal to the client 100 that the current request is denied.

If the comparison in step 850 results in an exact match, the current request for a secure data transaction is accepted. In step 870, the current requested secure data transaction is implemented by the WCP server 36. In one embodiment, the current requested secure data transaction could be a transfer of data between the client 100 and a web site 40 of FIG. 1A via the internet 52 of FIG. 1A.

The termination of the current secure data transaction as signaled by either the client 100 or the web site 40 in FIG. 1A is a signal to the WCP server 36 to terminate the current implementation in step 880. The WCP server discontinues the communication between the client 100 and the web site 40, and the client 100 is returned to step 810. The client 100 may then request another secure data transaction, whereby a new session identification number is required and the above process must be repeated. Alternately, the client 100 may either continue or discontinue communication with the WCP server 36.

Thus the present invention provides a method and system that will prevent an unauthorized user from gaining access to a secure data transaction by utilizing intercepted data in a replay attack. Further, the present invention provides a method and system that overcomes the requirement of prior systems that a client 100 always communicate with the same WCP server 36. That is, the present method and system may be implemented between any client 100 and WCP server 36, which is an advantage in larger networks having distributed servers where load balancing might be a problem.

The preferred embodiment of the present invention, a protocol to prevent replay attacks on secured wireless transactions, is thus described. While the present invention has been described in particular embodiments, it should be appreciated that the present invention should not be construed as limited by such embodiments, but rather construed according to the below claims.

What is claimed is:

1. A method for preventing replay attacks on secure data transactions, said method comprising the steps of:
   a) establishing, at a first server, a communicative coupling with a device;
   b) receiving, at the first server, a signal from the device requesting a session identification number, the session identification number being used for only one secure data transaction between the first server and the device wherein the server correlates the session identification number with the device so that any future generation of the same session identification number for the same device is prevented;
   c) generating, at the first server, said session identification number and communicating said session identification number from the first server to the device;
   d) receiving, at the first server, a signal from said device, wherein said signal comprises a request for the secure data transaction with a second server and includes said session identification number, and comparing, at the first server, the received session identification number with the generated session identification number to determine whether to authorize the secure data transaction,
   e) provided said request is authorized, implementing the secure data transaction between the device and the second server.

2. The method as recited in claim 1 wherein said method is implemented using a server computer system communicatively coupled to said device via the World Wide Web.

3. The method as recited in claim 1 wherein said device is a palmtop computer system.

4. The method as recited in claim 1 wherein said step e) comprises the step of:
   e1) encrypting data.

5. The method as recited in claim 1 wherein termination of said communicative coupling by said device indicates termination of said secure data transaction.

6. The method as recited in claim 1 wherein said method is implemented using a server computer system communicatively coupled to said device via TCP/IP based network.

7. In a portable device, a method for preventing replay attacks on secure data transactions, said method comprising the steps of:
   a) sending a signal to a central device requesting a session identification number, the session identification number being used for only one secure data transaction between the portable device and the central wherein the central device correlates the session identification number with the portable device so that any future generation of the same session identification number for the same portable device is prevented;
   b) receiving in response the session identification number;
   c) sending a signal to said central device requesting a secure data transaction with a remote device, said signal including said session identification number, and
   d) based on a positive confirmation of said session identification number at the central device, establishing the secure data transaction with the remote device wherein said session identification number is stored at the central device for the duration of said secure data transaction and wherein the session identification number is not passed back and forth between the central device and the remote device.

8. The method as recited in claim 7 wherein said portable device is a palmtop computer system.

9. The method as recited in claim 7 wherein said central device is a server computer system communicatively coupled to said portable device via the World Wide Web.

10. The method as recited in claim 7 wherein said step d) comprises the step of:
   d2) encrypting data.

11. The method as recited in claim 7 wherein termination of said communicative coupling by said portable device indicates termination of said secure data transaction.

12. The method as recited in claim 7 wherein said method is implemented using a server computer system communicatively coupled to said portable device.

13. The method as recited in claim 7 wherein said method is implemented using a server computer system communicatively coupled to said portable device via TCP/IP based network.

14. A system for preventing replay attacks on secure data transactions, said system comprising:
   a central device having a database comprising registration information for a user device, the user device communicatively coupled to the central device;
   said user device for sending to the central device a signal requesting a unique session identification number for a single secure data transaction with a remote device,
   the central device for responding by sending to the user device the unique session identification number, the session identification number having never been used before between the central device and the user device and wherein the central device correlates the session identification number with the user device so that any future generation of the same session identification number for the same user device is prevented,
   the central device for receiving a signal from the user device requesting the secure data transaction, the signal including the unique session identification number, and
   the central device for enabling the secure data transaction between the user device and the remote device.

15. The system of claim 14 wherein the user device is a palmtop computer system.

16. The system of claim 14 wherein the central device is a server computer system communicatively coupled to the device via the World Wide Web.

* * * * *